United States Patent [19]

Terada et al.

[11] Patent Number: 4,907,187

[45] Date of Patent: Mar. 6, 1990

[54] PROCESSING SYSTEM USING CASCADED LATCHES IN A TRANSMISSION PATH FOR BOTH FEEDBACK AND FORWARD TRANSFER OF DATA

[75] Inventors: Hiroaki Terada, Osaka; Katsuhiko Asada, Hyogo; Hiroaki Nishikawa, Osaka; Souichi Miyata; Satoshi Matsumoto, both of Nara; Hajime Asano, Osaka; Masahisa Shimizu, Osaka; Hiroki Miura, Osaka; Kenji Shima, Hyogo, all of Japan

[73] Assignees: Sanyo Electric Co., Ltd.; Sharp Kabushiki Kaisha; Matsushita Electric Industrial Co., Ltd.; Mitsubishi Denki Kabushiki Kaisha, all of Japan

[21] Appl. No.: 863,979

[22] Filed: May 16, 1986

[30] Foreign Application Priority Data

May 17, 1985 [JP] Japan ................................ 60-106272
May 17, 1985 [JP] Japan ................................ 60-106273
Mar. 12, 1986 [JP] Japan ................................ 61-055947

[51] Int. Cl.$^4$ ........................ G06F 13/00; G06F 9/38; G11C 19/00
[52] U.S. Cl. ................................ 364/900; 364/923.71; 364/926.5; 364/931.01; 364/931.11; 364/931.4; 364/939.7; 364/948.34; 364/951; 364/950.1; 377/81
[58] Field of Search ... 364/200 MS File, 900 MS File; 365/73, 77, 78, 221; 377/66, 77, 81

[56] References Cited

U.S. PATENT DOCUMENTS

| | | | |
|---|---|---|---|
| 3,166,715 | 1/1965 | Cogar | 377/66 |
| 3,404,377 | 10/1968 | Frankel | 340/200 |
| 3,727,204 | 4/1973 | de Koe | 364/900 |
| 3,893,086 | 7/1975 | Nanya | 365/78 |
| 4,011,545 | 3/1977 | Nadir | 364/200 |
| 4,058,773 | 11/1977 | Clark | 377/66 |
| 4,156,288 | 5/1979 | Spandorfer | 365/78 |
| 4,167,789 | 9/1979 | Faustini | 364/900 |
| 4,333,161 | 6/1982 | Catt | 365/73 X |
| 4,574,345 | 3/1986 | Konesky | 364/200 |
| 4,591,979 | 5/1986 | Iwashita | 364/200 |
| 4,679,213 | 7/1987 | Sutherland | 377/81 |
| 4,837,740 | 6/1989 | Sutherland | 364/900 |

FOREIGN PATENT DOCUMENTS 1117712 10/1984 U.S.S.R. ................................ 377/66

OTHER PUBLICATIONS

Adams, Jr., "Sequential Buffer Control", IBM TDB, vol. 14, No. 7, 12/71, pp. 2069-2070.

Primary Examiner—Archie E. Williams, Jr.
Assistant Examiner—Florin Munteanu-R.
Attorney, Agent, or Firm—Darby & Darby

[57] ABSTRACT

A data processing apparatus includes a self-running type shift register and this shift register includes a plurality of latch registers arranged in a cascade fashion. The latch register latches a data packet on a word basis. In each latch register, a coincidence element is disposed in association therewith and these coincidence elements allow transfer of data from a post-stage latch register provided that a pre-stage latch register is vacant. A data processing element is installed between two latch registers and the data processing element processes operand data from either or both of the two latch register in response to the kind of processing shown by an operation code comprised in the preceding word. The result of processing is transferred to the pre-stage latch register when the pre-stage latch register is placed in the vacant state under control of the coincidence element.

23 Claims, 14 Drawing Sheets

| 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| 1 | 0 | f3 | f2 | f1 | f0 | | | | | | | | | | | | |
| 0 | 1 | A7 | A6 | B7 | B6 | A5 | A4 | B5 | B4 | A3 | A2 | B3 | B2 | A1 | A0 | B1 | B0 |

| 1 | 0 | f3 | f2 | f1 | f0 | | | | | | | | | | | | |
|---|---|---|---|---|---|---|---|---|---|---|---|---|---|---|---|---|---|
| 0 | 0 | A7 | A6 | B7 | B6 | A5 | A4 | B5 | B4 | A3 | A2 | B3 | B2 | A1 | A0 | B1 | B0 |
| | | | | | | | | | | | | | | | | | |
| 0 | 0 | A7 | A6 | B7 | B6 | A5 | A4 | B5 | B4 | A3 | A2 | B3 | B2 | A1 | A0 | B1 | B0 |
| 0 | 1 | A7 | A6 | B7 | B6 | A5 | A4 | B5 | B4 | A3 | A2 | B3 | B2 | A1 | A0 | B1 | B0 |

PROCESSING SYSTEM USING CASCADED LATCHES IN A TRANSMISSION PATH FOR BOTH FEEDBACK AND FORWARD TRANSFER OF DATA

BACKGROUND OF THE INVENTION

1. Field of the Invention

The present invention relates to a data processing apparatus and a data transmission path. More specifically, the present invention relates to a data processing apparatus of data-driven type.

2. Description of the Prior Art

The Neumann type data processing apparatus has deficiencies such as a low processing speed and a difficulty in parallel processing due to sequential processing. Then, recently, the data-driven type (data-flow type) data processing apparatus has been proposed and realized An example of such a data-driven type data processing apparatus is disclosed, for example, at pages 181 through 218 of the magazine "Nikkei Electronics" issued on Apr. 9, 1984.

In the data-driven type processing apparatus, data flow is not uniform because as processing is performed operands begin to be processed in sequence of firing Then, conventionally a plurality of buffer memories (for example, FIFO memory) and processing elements are connected by a synchronous type bus.

In such a conventional data processing apparatus, the capacity of the FIFO memory depends greatly upon the speed and timing of firing, and therefore it is very difficult to design or select the capacity of this FIFO memory to enable a quite smooth processing. Accordingly, in actuality, such a capacity is designed appropriately in advance, and when the FIFO memory is fully occupied, the entire process is stopped or finished.

On the other hand, in order to avoid such a situation, a special overflow processing mechanism has only to be adopted to control continuation and stop of input for each portions. However, such a processing mechanism is subjected to complication of hardware.

SUMMARY OF THE INVENTION

Therefore, the principal object of the present invention is to provide a novel data-driven type data processing apparatus.

Another object of the present invention is to provide a data-driven type data processing apparatus capable of a smooth data processing.

Still another object of the present invention is to provide a data-driven type data processing apparatus which has a simple constitution while a higher processing speed can be expected.

Still another object of the present invention is to provide a data transmission path which has such a data processing function.

As used herein, the terms "post-stage" and "pre-stage" will be understood to be synonymous with "upstream" and "downstream", respectively. Thus, a shift register comprised of a plurality of latching means, data will always flow from a post-stage latching means to a pre-stage latching means.

To be brief, the present invention is of a data processing apparatus comprises a plurality of latch registers arranged in a cascade fashion which latch a data packet comprising data of least two words on a word basis, a process instructing circuit for designating the kind of processing in response to data of a pre-stage latch registers, data processing elements which are disposed between a pre-stage and post-stage latch registers and receive data from the pre-stage and/or post-stage latch registers, and process the data based on designation from the process instructing circuit, a vacancy detecting element for detecting vacancy of the pre-stage latch registers. The data is transferred through the data processing element to the pre-stage latch registers in response to a detection of vacancy of the pre-stage latch registers by a vacancy element.

Data are transferred from the post-stage latch registers to the pre-stage latch registers. At this time, for example, an operation code comprised in this data is inputted to the process instructing circuit. The process instructing circuit produces the kind of processing or a sequence of kinds of processing in the data processing elements in accordance with the content thereof, giving the same to the data processing elements. At this time, operand data of the pre-stage latch registers and/or the post-stage latch registers are given to the data processing elements and processing according to the designation from the process instructing circuit is executed. On the other hand, when the vacancy detecting circuit detects vacancy of the pre-stage latch registers, the data passes through the data processing elements to the pre-stage latch registers.

In accordance with the present invention, when the pre-stage latch registers is in the vacant state, data inputting to the data processing elements and data outputting therefrom are automatically repeated, and therefore a constitution as an asynchronous type data processing apparatus can be made. Accordingly, processing can be executed smoothly without installing a special buffer control or the like for controlling frequency of processing the data processing elements. Also, in accordance with the present invention, only by disposing the data processing elements between the latch registers, repetitive data processing can be performed efficiently, and the design thereof is also very simple.

In a preferred embodiment in accordance with the present invention, a plurality of data processing elements are installed, and each data processing elements is disposed between two latch registers of different combination. Each of these data processing elements executes processing of the same kind respectively, or executes processing of different kind respectively.

In another embodiment in accordance with the present invention, a transmission controlling element is installed which is for normally transferring data to the pre-stage latch registers in the stopped state and releasing the stopped state as required.

In this embodiment, the transmission controlling element releases the stopped state in response to an input of a signal for transmitting the data (for example, TRO), and shifts the data to the pre-stage latch register when the data placed in the post-stage latch registers is not to be stopped. Then, the stopped state is restored again not later than the next input of the signal. In the case where the data latched in the post-stage latch registers is to be stopped, the transmission controlling element does not release the stopped state even when the data transmission signal (TRO) is inputted, and thereafter when a specific condition holds, it releases the stopped state and shifts data to the pre-stage latch registers, and thereafter restores the stopped state again.

In accordance with this embodiment, a data processing apparatus without malfunction is obtainable irrespective of a large or small delay of propagation of a data transmission path.

The present invention is applicable also to a novel data transmission path utilizing the above-described concept of the data processing apparatus. This means that such a data transmission path can perform push-in and pop-out of data independently and simultaneously, and is further constituted by using a self-running type shift register wherein the pushed-in data is shifted automatically to the pre-stage latch register provided that the pre-stage latch register is vacant, and comprises the data processing element disposed between the latch registers.

These objects and other objects, features, aspects and advantages of the present invention will become more apparent from the following detailed invention when taken in conjunction with accompanying drawings.

DESCRIPTION OF THE PREFERRED EMBODIMENTS

Figure 1:
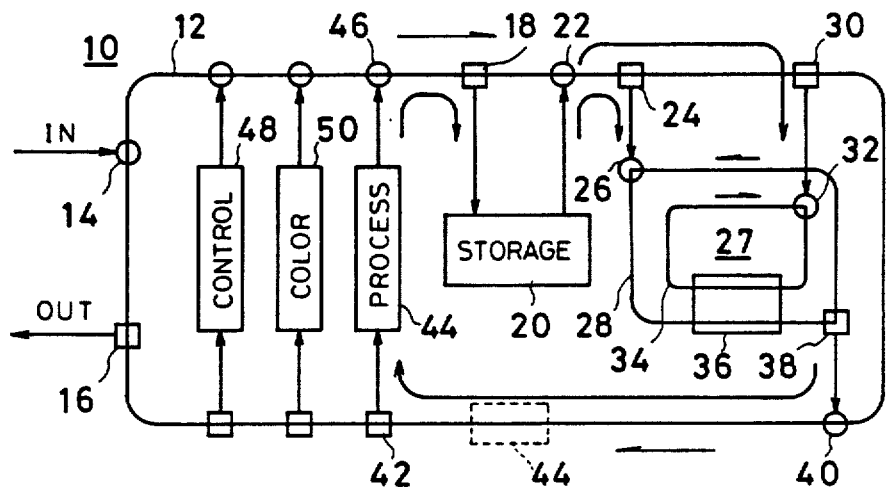
FIG. 1 is a concept view showing one example of a parallel-processing type data processing apparatus of embodying the present invention.

FIG. 1 is a system concept view showing one example of a parallel-processing type data processing apparatus capable of embodying the present invention. A system 10 comprises an asynchronous delay line ring 12 as a data transmission path, and a data packet to be processed through a joining part 14 is given to this asynchronous delay line ring 12, and the processed data is outputted through a branching part 16. The data packet given from the joining part 14 is branched by the branching part 18 through the asynchronous delay line ring 12, being given to a function storage 20. The data read from the function storage 20 is given again to the asynchronous delay line ring 12 through a joining part 22.

Figure 2:
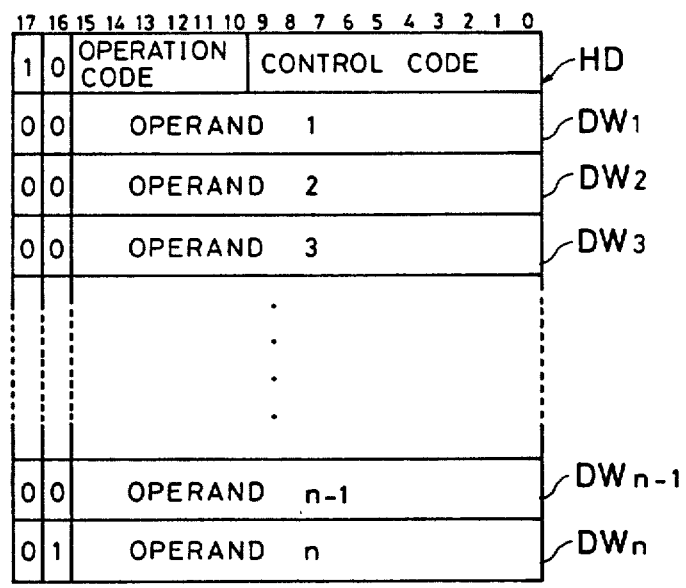
FIG. 2 is an illustrative view showing one example of a data packet to be processed.

The data packet given from the function storage 20, for example, as shown in FIG. 2, comprises a header HD and the following plural number of data words $DW_1$-$DW_n$. The header HD comprises an operation code and a control code, and this operation code comprises a code showing the packet construction and a code showing the content or kind of processing. For the code showing the packet construction, for example, the order code showing identification of the header, the last data word or the like is given, for example, by two bits, the 18th and 17th bits. The code showing the content of processing is particularly called the F code, being used for specifying the kind of processing, for example, "+", "−", - - -or replacement or insertion of data or the like. The control code comprises the node information ascribed to the program construction, that is, the logical information such as physical address information and color.

The data packet as described above which is transmitted by the asynchronous delay line ring 12 is given to a first loop-shaped data transmission path 28 constituting an firing part 27 through the branching part 24 and the joining part 26. A different data packet is taken into a second loop-shaped data transmission path 34 constituting the firing part 27 through a different branching part 30 and a different joining part 32. The data packets given to the first and the second loop-shaped data transmission paths 28 and 34 are transmitted through the respective loops in the directions reverse to each other, being given to an firing detecting part 36 constituting the firing part 27 together with these transmitting paths.

In the firing detecting part 36, the control codes comprised respectively in two data packet are compared with each other, and thereby decision is made on whether or not the data packet existing on the first loop-shaped data transmission path 28 and the data packet existing on the second loop-shaped data transmission path 34 make a pair, and one new data packet is produced based on specific data packets detected as a pair of data packets. The new data packet thus produced is placed, for example, on the first loop-shaped data transmission path 28, being brought again onto the asynchronous delay line ring 12 through a branching part 38 and a joining part 40.

The new data packet transferred on the asynchronous delay line ring 12 is given to an operation processing part 44 through a branching part 42, and here single or plural operand data which is comprised in the data packet and follows the header is processed according to the operation code comprised in the header of the data packet. The data processed by this operation processing part 44 is joined again to the asynchronous delay line ring 12 through a joining part 46. The result of this processing is given again to the function storage 20 or outputted through the branching part 16.

Meanwhile, a control instruction processing part 48 and a color controlling part 50 are further installed in the system 10.

The present invention is applicable to the operation processing part 44 in the system 10 as shown in FIG. 1. However, such an operating processing part 44 may be inserted in series on the data transmission path 12 as shown by a dotted line in FIG. 1 in place of being inserted in parallel to the main data transmission path 12.

Figure 3:
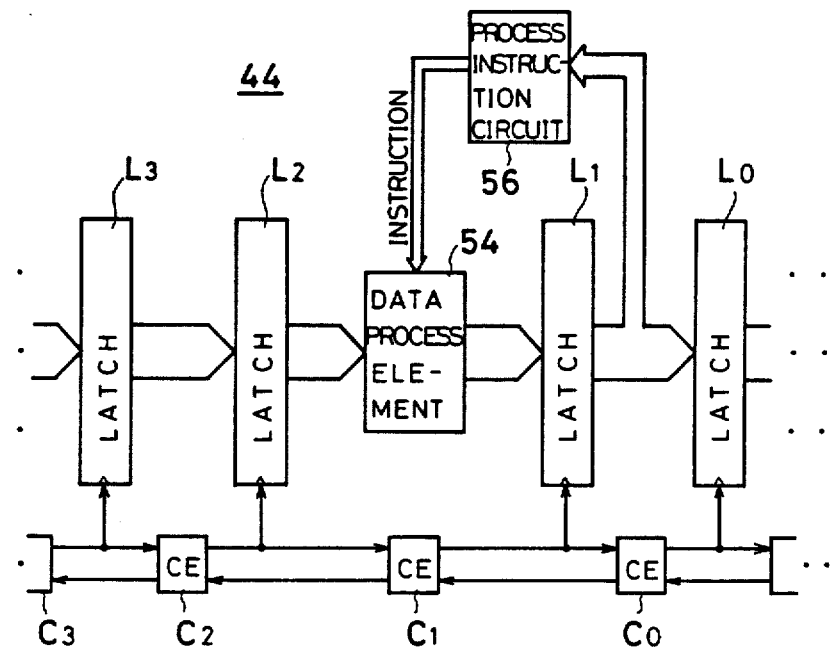
FIG. 3 is a block diagram showing one example of one embodiment in accordance with the present invention.

FIG. 3 is a block diagram showing one embodiment in accordance with the present invention. The operation processing part 44 comprises latch registers $L_0$, $L_1$, $L_2$, $L_3$, - - -, which are connected in a multi-stage cascade fashion and C elements (Coincidence elements) $C_0$, $C_1$, $C_2$, $C_3$, - - -, which are installed in association with the respective latch registers. These latch registers $L_0$–$L_3$ and C elements $C_0$–$C_3$ cooperate to constitute an asynchronous self-running type shift register. This asynchronous self-running type shift register refers to a shift register such that push-in and pop-out of data can be performed independently and simultaneously and further the pushed-in data is transferred automatically without using a shift clock provided that the pre-stage latch register is vacant. Such an asynchronous self-running type shift register can be employed also as the main data transmission path 12 and the first and the second loop-shaped data transmission paths 28 and 34.

Figure 4:
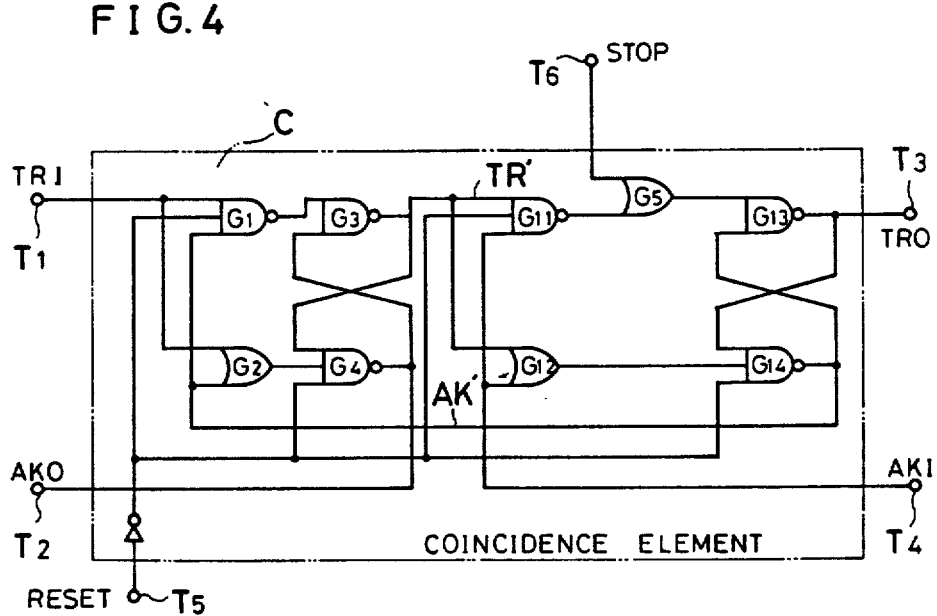
FIG. 4 is a circuit diagram showing one example of a coincidence element used for this embodiment.
Figure 5:
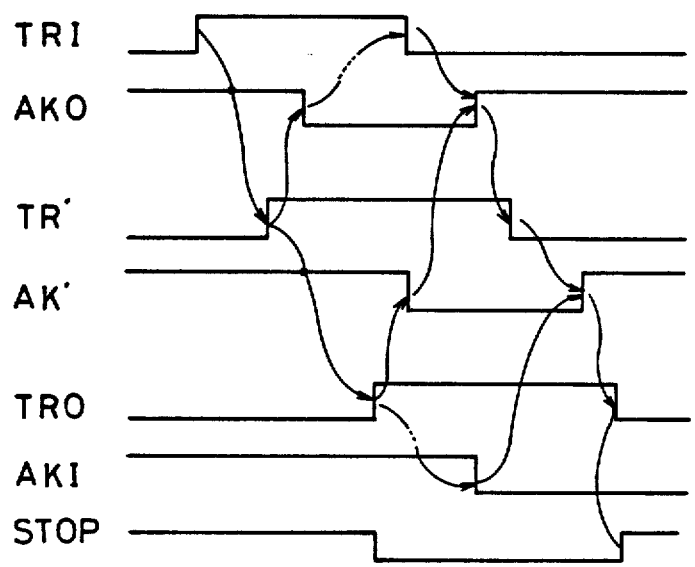
FIG. 5 is a timing chart for explaining operation of the coincidence element as shown in FIG. 4.

Here, description is made on the C element constituting the asynchronous self-running type shift register in reference to FIG. 4 and FIG. 5. The C element C comprises six terminals $T_1$–$T_6$, and a signal TRI (Transfer In) from the post-stage C element is given to the terminal $T_1$, and signal AKO (Acknowledge Out) is outputted to the post-stage C element from the terminal $T_2$. A signal TRO (Transfer Out) is outputted to the pre-stage C element from the terminal $T_3$, and a signal AKI (Acknowledge In) from the pre-stage C element is given to the terminal $T_4$. The signal TRO is futher given to the corresponding latch register as a transfer command signal. Then, the signal AKI is given as a vacancy signal of the pre-stage latch register.

Meanwhile, a reset signal RESET is given to the terminal $T_5$, and a stop signal STOP is given to the terminal $T_6$.

In a circuit in FIG. 4, when the reset signal RESET is given from the terminal $T_5$, this signal is inversed by an inverter, and outputs of four NAND gates $G_1$, $G_4$, $G_{11}$ and $G_{14}$ become the high level, and accordingly outputs of NAND gates $G_3$ and $G_{13}$ receiving them go to the low level. The high-level output of the NAND gate $G_4$ becomes the signal AKO, being given from the terminal $T_1$ as the signal AKI to the post-stage C element. This is a signal representing the vacant state of the pre-stage latch register. At this time, if no data arrives yet, the signal TRI to the terminal $T_1$ if of the low level. When the reset signal RESET to the terminal $T_5$ is released, the output of the inverter goes to the high level, while a signal AK' from the NAND gate $G_{14}$ is also of the high level, and this state is the initial state.

In the initial state, accordingly, respective outputs of the NAND gates $G_1$ and $G_{11}$ are of high level, and one of inputs of OR gates $G_2$ and $G_{12}$ is of the high level. Consequently, two inputs of the NAND gates $G_3$ and $G_{13}$ are of high level respectively, and accordingly outputs of these NAND gates $G_3$ and $G_{13}$ are of the low level respectively. This means that a signal TR' and the signal TRO from the terminal $T_3$ are of the high level. Inputs of the NAND gates $G_4$ and $G_{14}$ go to the low level, high level and high level respectively, and outputs of these NAND gates become the high level respectively.

When data is transferred and the signal TRI to the terminal $T_1$ given from the post-stage C element is turned to the high level as shown in FIG. 5, all of three inputs of the NAND gate $G_1$ go to the high level, and the output thereof becomes the low level. Then, the output of the NAND gates $G_3$, that is, the signal TR' goes to the high level as shown in FIG. 5, and the output of the NAND gate $G_4$ goes to the low level. When the signal TR' becomes the high level, the output of the NAND gate $G_{11}$ goes to the low level, the output TRO of the NAND gate $G_{13}$ goes to the high level and the output AK' of the NAND gate $G_{14}$ goes to the low level. The outputs of the NAND gates $G_4$ and $G_{14}$ return to the inputs of the NAND gates $G_3$ and $G_{13}$ respectively, and the outputs of these NAND gates $G_3$ and $G_{13}$ are locked in the high-level state. Thus, as shown in FIG. 5, the signal AKO from the terminal $T_2$ goes to the low level and it is delivered to the post-stage C element that the data has been transferred to the latch register corresponding to this C element, that is, transfer of the data is not accepted in this state. Also, the output of the NAND gate $G_{13}$ is of the high level, and the high-level signal TRO is given to the pre-stage C element from the terminal $T_3$. This high-level signal TRO is given as a command of transferring to the latch register corresponding thereto, and the data of this latch register is sent to the pre-stage.

When the signal AKO becomes the low level, the signal TRI goes to the low level as shown in FIG. 5, and accordingly the output TR' of the NAND gate $G_1$ returns to the high level. Furthermore, as described above, the output AK' of the NAND gate $G_{14}$ is changed to the low level, and thereby the output AKO of the NAND gate $G_4$ returns to the high level, and the output TR' of the NAND gate $G_3$ returns to the low level.

When the signal AKO from the pre-stage C element, that is, the signal AKI given from the terminal $T_4$ is changed to the low level from the high level as shown in FIG. 5, that is, when a vacancy of the pre-stage latch register is detected, the input of the OR gate $G_{12}$ goes to the low level, and the signal TR' is also of the low level, and therefore the output of this OR gate $G_{12}$ also goes to the low level. At this time, the output of the NAND gate $G_{13}$ is of the high level, and therefore the output of the NAND gate $G_{14}$ is changed to the high level. Consequently, the input of the NAND gate $G_{13}$ goes to the high level, and the output of the NAND gate $G_{13}$ returns to the low level. Thus, the same state as the initial state is restored.

If the signal AKO from the pre-stage C element, that is, the signal AKI from the terminal $T_4$ is kept intact at the low level, that is, if the latch register corresponding to the pre-sage C element is not yet in the vacant state, one input of the NAND gate $G_{11}$ is kept intact at the low level, and therefore the signal TRI from the terminal $T_1$ is given as high-level signal, and the NAND gate $G_{11}$ does not act even when the signal TR' is changed to the high level, and the signal TRO does not go to the high level, and thereby acceptance of data from the post-stage is rejected, and accordingly no data can be transferred to the latch register corresponding to this C element in this state.

Thus, as shown in FIG. 33, the asynchronous self-running type shift register is constituted with the latch registers $L_0$–$L_3$ and the C elements $C_0$–$C_3$.

Meanwhile, when the stop signal STOP is given to this C element from the terminal $T_6$ in the initial state, this high-level signal makes the output of the OR gate $G_5$ to fix the high level, and the data transfer is stopped.

As shown in FIG. 3, a data processing element 54 comprising, for example, an ALU (Arithmetic Logic Unit), a multiplier and the like is disposed between the latch registers $L_1$ and $L_2$ constituting the asynchronous self-running type shift register comprised in the operation processing part 44. Then, the data from the pre-stage latch register $L_1$, particularly the operation code (FIG. 2) comprised in the data packet is given to a process instructing circuit 56. To be brief, this process instructing circuit 56 gives a designating signal for designating the kind or manner of data processing to the data processing element 54 in response to the operation code comprised in the latch register $L_1$. Accordingly when the data of the post-stage register $L_2$ is given to the data processing element 54 and is processed there, the content of the processing is controlled by the operation code latched in the latch register $L_1$. Accordingly when the data of the post-stage register $L_2$ is given to the data processing element 54 and is controlled by the operation code from the pre-stage latch register $L_1$. In other words, the kind of processing or the sequence of kinds of processing for the following data is determined by the preceding data.

Figure 6:
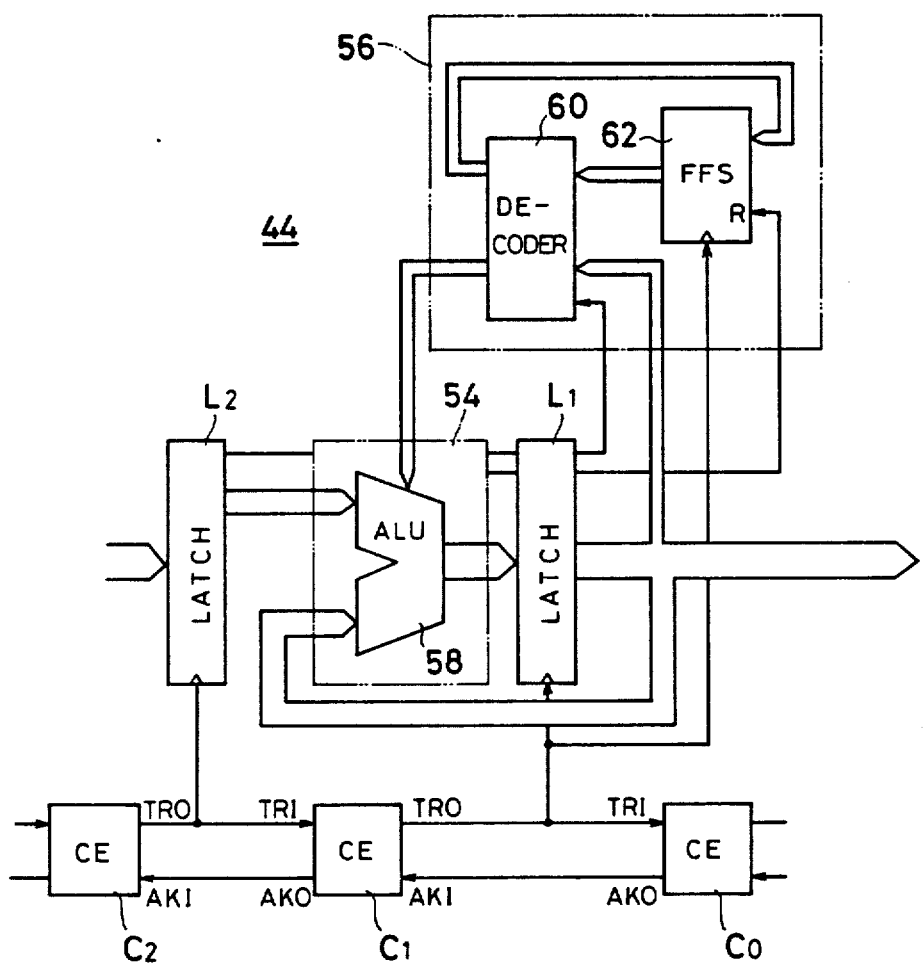
FIG. 6 is a block diagram showing further embodiment in accordance with the present invention.

FIG. 6 is a block diagram showing another embodiment in accordance with the present invention. As described previously in FIG. 3, the operation processing part 44 comprises the latch register $L_1$ and $L_2$, and the data processing elements 54 is inserted therebetween. In this embodiment, the data processing element 54 comprises an ALU 58, and operand data (FIG. 2) as objects to be processed from the latch registers $L_1$ and $L_2$ are given to two inputs of this ALU 58. Then, C elements $C_1$ and $C_2$ as described in FIG. 4 are installed correspondingly to the respective latch registers $L_1$ and $L_2$. The 18th bit (and the 17th bit) data of the latch register is given to the data processing element 54. The data processing element 54 represents that the data is the header when this 18th bit data is "1", and the data processing element 54 outputs the data from the latch register $L_2$ intact to the latch register $L_1$. This means that when the data is the header, the data processing element (ALU) is put in NOP (No Operation).

The process instructing circuit 56 comprises a decoder 60 and a group of flip-flops 62. An F code comprised in the operation code (FIG. 2) from the pre-stage latch register $L_1$ and the 18th bit data comprised in that operation code, that is, one bit of the order code are given to the decoder 60. The signal TRO from the C element $C_1$ corresponding to the latch register is given to the group of flip-flops 62 as a trigger input. The signal from the decoder 60 is given to the set input of the group of flip-flops 62, and the 17th bit data comprised in the operation code from the latch register $L_1$, that is, one bit of the order code is given to the reset input. The output of this group of flip-flops 62 is given again to the decoder 60, and accordingly, the output of the decoder 60 is held by the group of flip-flops 62. The output of the decoder 60 is given to the ALU 58 comprised in the data processing element 54 as a processing designating signal.

In this circuit of FIG. 6, data transfer from the post-stage latch resigner $L_1$ is controlled by the corresponding C elements $C_2$ and $C_1$ respectively as described above. More specifically, data is outputted from the latch register $L_1$, and when this latch register $L_1$ is about to be place in the vacant state, the corresponding C element $C_1$ detects this state, outputting the signal AKO of the high level. This signal AKO is inputted to the post-stage C element $C_2$ as the high-level signal AKI. At this time, if the operand data exists in the post-stage latch register $L_2$, the signal TRO from the corresponding C element $C_2$ goes to the high level, and this is given to the pre-stage C element $C_1$ as the high-level signal TRI. The high-level signal TRO given also to the latch register $L_2$ as a transfer command signal and therefore the operand data latched in the latch register 12 is outputted to the pre-stage latch register $L_1$.

As described above, when the header of the data packet is inputted to the pre-stage latch register $L_1$ through the ALU 58 of the data processing element 54, the F code is given to the decoder 60 together with the 18th bit data comprised in the data packet. When the header of the data packet is given, since the 18th bit signal is of the high level as shown in FIG. 2, responsively, the decoder 60 enables the operation code from the latch register $L_1$, and accordingly, the decoder 60 decodes the F code inputted from the latch register $L_1$. For example, if the F code at that time is "NOP", a "NOP" command is given to the ALU 58 comprised in the data processing element 54 from this decoder 60. In the decoder 60, for example, "F+1" is further produced, being given as a signal to the group of flip-flops 62.

Meanwhile, it is needless to say that the F code for the first data word, that is, the operand 1 may be an appropriate single-term operation, for example, increment or inversion other than "NOP" as described above.

To be further detailed, when the operation code of the header of the data packet of the pre-stage latch register $L_1$ is inputted to the decoder 60, for example, the operation command of "increment" is given to the ALU 58 from the decoder 60. When the data is loaded in the post-stage latch register $L_2$, the "increment" operation is executed in the ALU 58. Then, when a vacancy of the pre-stage latch register $L_1$ is detected by the C element $C_1$, the result of the above-described "increment" operation is given to the pre-stage latch register $L_1$ at that timing. At this time, "F+1" is written to the group of flip-flops 62 at the same timing. At this point, the operand data of the data packet exists in the pre-stage latch register $L_1$, and accordingly, as the input of the decoder 60, the code of "F+1" from this group of flip-flops 62 is enabled. This means that after the header of the pre-stage latch register $L_2$ has been decoded by the decoder 60, the decoder 60 receives the code from the group of flip-flops 62.

Thereafter, the decoder 60 decodes "F+1" from that group of flip-flops 62. In the decoder 60, assuming that formation is made so as to produce, for example, the operation command of "+", if this "F+1" is inputted, the operation command of "+" is given to the ALU 58 from the decoder 60 after the operation command of "increment" has been outputted first from this decoder 60. Accordingly, in the ALU 58, the "+" operation is executed between the data brought back from the pre-stage latch register $L_1$ and the data from the post-stage latch register $L_2$. Thus, required operation commands are outputted from the decoder 60 until the data of the pre-stage latch register $L_1$ becomes the data word of the last operand in the data packet, and in the ALU 58, the operation responding thereto is repeated.

In the last data word, as shown in FIG. 2, one bit of the order code, that is, the 17th bit goes to the high level. This high-level signal is given as the reset input of the group of flip-flops 62. Accordingly, thereafter outputs of this group of flip-flops 62 becomes, for example, all zero.

Thus, the operation for a plurality of operands comprised in one data packet is executed. Then, the kind of processing for the operand data from the post-stage latch register $L_2$ at that time is specified by the data of the pre-stage latch register $L_1$. Then, the data is popped out from the post-stage latch register $L_2$ provided that the pre-stage latch register $L_1$ is in the vacant state, and therefore this operation processing part 44 can be constituted as a complete asynchronous type system.

Figure 7:
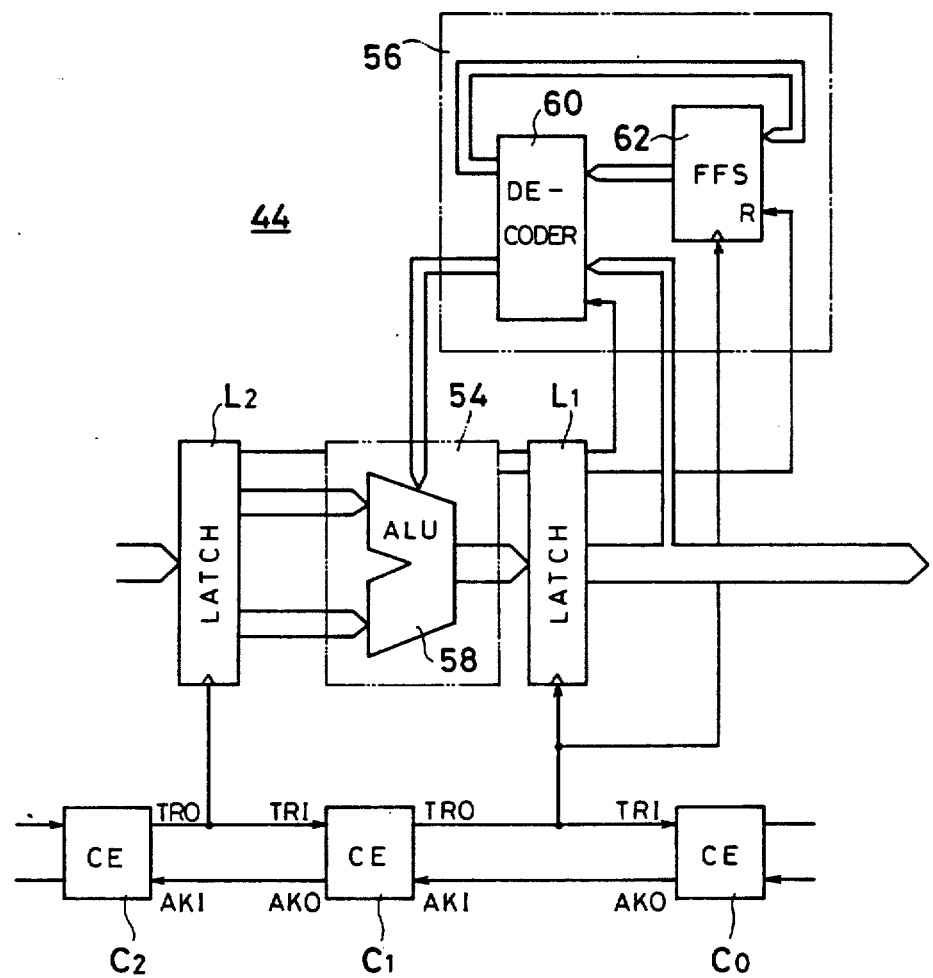
FIG. 7 is a block diagram showing still further embodiment in accordance with the present invention.

FIG. 7 is a block diagram showing another embodiment in accordance with the present invention. In FIG. 6 embodiment, a data packet of a construction as shown in FIG. 2 is utilized, and thereby the data processing element 54, that is, the ALU 58 receives the data of the pre-stage latch register $L_1$, that is, the preceding operand data and the data of the post-stage latch register $L_2$, that is, the following operand data as the input thereof, and the result of processing is given again to the pre-stage latch register $L_1$.

Figure 8:
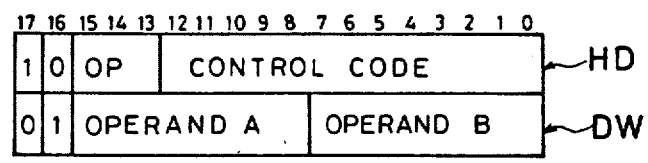
FIG. 8 is an illustrative view showing a construction of the data packet to be processed in FIG. 7 embodiment.

On the other hand, in this FIG. 7 embodiment, a data packet of a construction as shown in FIG. 8 is utilized. In the data packet as shown in FIG. 8, the data word DW comprises a plurality of (two in this example) operand data in a parallel fashion, and when this data word is popped out, two operand data are outputted simultaneously. Accordingly, in FIG. 7 embodiment, the ALU 58 comprised in the data processing element 54 receives only the data from the post-stage latch register $L_2$, giving the result to the pre-stage latch register $L_1$ However, also in this embodiment, by the process instructing circuit 58, based on the data of the pre-stage latch register $L_1$, that is, the preceding data word, processing for the following data in the ALU 58 of the data processing element 54 is designated. Then, also in this FIG. 7 embodiment, the operation processing part 44 is constituted as a complete asynchronous type system.

Figure 9:
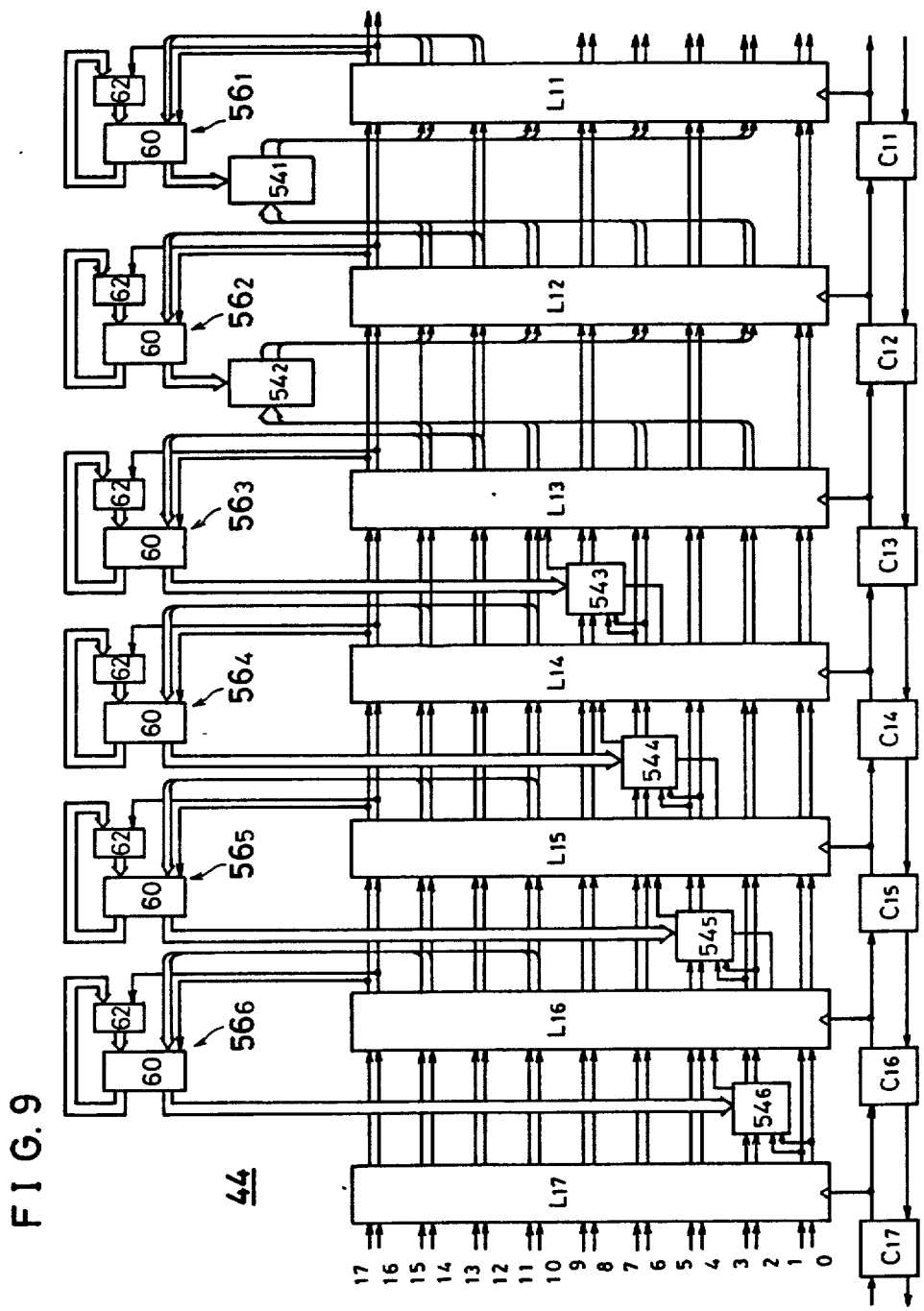
FIG. 9 is a block diagram showing another embodiment in accordance with the present invention.

FIG. 9 is a block diagram showing another embodiment in accordance with the present invention. In the embodiments as shown in the previous FIG. 6 and FIG. 7, description is made on the systems which both process simultaneously, for example, 8-bit data. On the other hand, this FIG. 9 shows an embodiment for processing 8-bit data two bits by two bits in a sequential fashion. However, the basic constitution thereof is the same as those of the two previous embodiments.

The operation processing part 44 in FIG. 9 is constituted in a manner of comprising the asynchronous self-running type shift register composed of a combination of seven-stage latch registers $L_{11}-L_{17}$ and associated seven-stage C elements $C_{11}-C_{17}$. Meanwhile, the latch registers $L_{11}-L_{17}$ are all constituted in a 18-bit form and data processing elements $54_1-54_6$ are inserted therebetween respectively. In this embodiment, the data processing elements $54_3-54_6$ all comprises a two-bit ALU, the data processing element $54_2$ comprises a eight-bit shifter and the data processing element $54_1$ comprises a plus, minus or zero deciding circuit. Accordingly, in this embodiment, the result of the operation performed by the data processing elements $54_3-54_6$, that is, the four ALU's is shifted by the data processing element $54_2$, that is, the eight-bit shifter as required, and thereafter plus, minus or zero of the result is decided by the data processing element $54_1$, that is, the plus, minus or zero deciding circuit, being pushed-in the latch register $L_{11}$ of the foremost stage.

The process instructing circuit $54_1-54_6$ as described previously in FIG. 6 and FIG. 7 are installed corresponding to the data processing elements $54_1-54_6$. The process instructing circuits $56_1-56_6$ comprise the decoder 60 and the group of flip-flops 62, respectively. As described above, the 18th bit is given to the decoder 60 of each of the process instructing circuits $56_1-56_6$ from the corresponding latch registers $L_{11}-L_{17}$ and the 17th bit is given to the group of flip-flops 62.

The decoder 60 comprised in each of these process instructing circuits $56_1-56_6$ achieves the decoding functions as shown in the following Table 1.

TABLE 1

| $f_3$ | $f_2$ | $f_1$ | $f_0$ | $S_4$ | $S_3$ | $S_2$ | $S_1$ | $S_0$ |
|---|---|---|---|---|---|---|---|---|
| 0 | 0 | 0 | 0 | 0 | 0 | 0 | 0 | 0 |
| 0 | 0 | 0 | 1 | 0 | 0 | 0 | 0 | 1 |
| 0 | 0 | 1 | 0 | 0 | 0 | 0 | 1 | 0 |
| 0 | 0 | 1 | 1 | 0 | 0 | 0 | 1 | 1 |
| 0 | 1 | 0 | 0 | 0 | 0 | 1 | 0 | 0 |
| 0 | 1 | 0 | 1 | 0 | 0 | 1 | 0 | 1 |
| 0 | 1 | 1 | 0 | 0 | 0 | 1 | 1 | 0 |
| 0 | 1 | 1 | 1 | 0 | 0 | 1 | 1 | 1 |
| 1 | 0 | 0 | 0 | 0 | 1 | 0 | 0 | 0 |
| 1 | 0 | 0 | 1 | 0 | 1 | 0 | 0 | 1 |
| 1 | 0 | 1 | 0 | 0 | 1 | 0 | 1 | 0 |
| 1 | 0 | 1 | 1 | 0 | 1 | 0 | 1 | 1 |
| 1 | 1 | 0 | 0 | 1 | 0 | 0 | 0 | 0 |
| 1 | 1 | 0 | 1 | 1 | 0 | 0 | 0 | 1 |
| 1 | 1 | 1 | 0 | 1 | 0 | 0 | 1 | 0 |
| 1 | 1 | 1 | 1 | 1 | 0 | 0 | 1 | 1 |

In the cases of the first four F codes "0000", "0001", "0010" and "0011", outputs $S_2$, $S_3$ and $S_4$ all become "0", and as described later, all of the data processing elements $54_1-54_6$ are placed in the NOP (No-Operation) state. Then, in the cases of the next four F codes "0100", 0101", "0110" and "0111", the output $S_2$ become "1" in any case. Accordingly, as described later, only the two-bit ALU's comprised in the data processing elements $54_3-54_6$ are enabled. In the cases of the next four F codes "1000", "1001", "1010" and "1011", the output $S_3$ becomes "1" in any case and as described later, the eight-bit shifter comprised in the data processing element $54_2$ is enabled. In the cases of the last four F codes, "1100", "1101", "1110" and "1111", the output $S_4$ becomes "1" in any case and as described later, the plus, minus or zero deciding circuit comprised in the data processing element $54_1$ is enabled.

Figures 10A, 10B, 11:
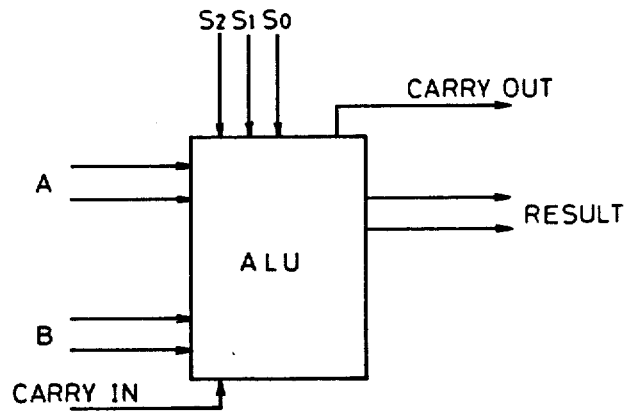
FIG. 10A and FIG. 10B are illustrative views showing a constitutional example of the data packet to be processed in FIG. 9 embodiment.
FIG. 11 is a block diagram showing a two-bit ALU used for FIG. 9 embodiment.

In this FIG. 9 embodiment, data packets as shown in FIG. 10A and FIG. 10B are processed. FIG. 10A shows the case where only one-word data is comprised in the data packet, and FIG. 10B shows the case where a plurality of data words $DW_1-DW_n$ are comprised in the data packet. Then, processing is performed between two eight-bit data $A_0-A_7$ and $B_0-B_7$, and the result thereof is stored at the position in the pre-stage latch register corresponding to the data $A_0-A_7$. In addition, in these FIG. 10A and FIG. 10B, symbols $f_0-f_3$ comprised in the operation code designate the F code.

The two-bit ALU comprised in each of the data processing elements $54_3-54_6$, as shown in FIG. 11, receives an input A and an input B executes the specified operation in response to control signals $S_0$, $S_1$ and $S_2$, and gives the result thereof to the corresponding two bits of the pre-stage latch register. Also, a carry signal from this ALU is given to the pre-stage ALU. These two-bit ALU's execute the functions as shown in the next Table 2.

TABLE 2

| $S_1$ | $S_0$ | Output |
|---|---|---|
| 0 | 0 | A + B |
| 0 | 1 | A − B |
| 1 | 0 | A OR B |
| 1 | 1 | A AND B |

*Note that $S_2 = 1$

Figure 12:
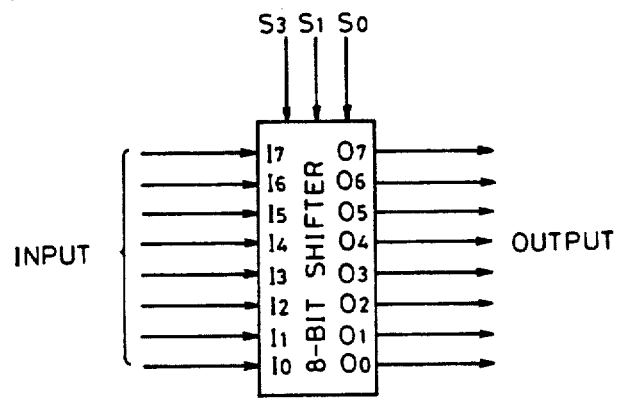
FIG. 12 is a block diagram showing an eight-bit shifter used for FIG. 9 embodiment.

The eight-bit shifter comprised in the data processing element $54_2$ adopts, for example, a constitution as shown in FIG. 12. This means that the eight-bit shifter receives eight-bit inputs $I_0-I_7$, and outputs eight-bit data $O_0-O_7$ as the output thereof. Then, the functions thereof are given in the next Table 3.

TABLE 3

| $S_1$ | $S_0$ | Function |
|---|---|---|
| 0 | 0 | Left shift (Arithmetic) |
| 0 | 1 | Left shift (Logic) |
| 1 | 0 | Right shift (Arithmetic) |
| 1 | 1 | Right shift (Logic) |

*Note that $S_3 = 1$

Figure 13:
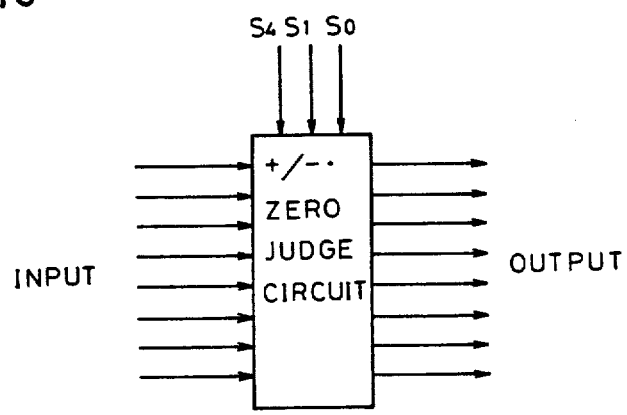
FIG. 13 is a block diagram showing a circuit for deciding plus, minus or zero used for FIG. 9 embodiment.

The plus, minus or zero deciding circuit comprised in the data processing element $54_1$ has a constitution as shown in FIG. 13 and executes functions as shown in the next Table 4.

TABLE 4

| $S_1$ | $S_0$ | Function |
|---|---|---|
| 0 | 0 | A > 0 ? |
| 0 | 1 | A ≦ B ? |
| 1 | 0 | A = 0 ? |
| 1 | 1 | A ≠ 0 ? |

*Note that $S_4 = 1$

For the functions as shown in Table 4, this plus, minus or zero deciding circuit outputs "FF (hex)" if "True", and outputs "00 (hex)" if "False", giving to the pre-stage latch register $L_{11}$.

Also in this FIG. 9 embodiment, when a vacant state of the pre-stage latch register is detected by the corresponding C element, the data from the post-stage latch register is outputted to the pre-stage latch register. Then, during transfer of the data, the data are processed by the data processing elements $54_1-54_6$ inserted between the respective latch registers, and the result of the processing is given to the pre-stage latch register.

To be detailed, first, when the data is transferred from the last-stage latch register $L_{17}$ to the pre-stage latch register $L_{16}$, as described in detail previously in FIG. 6, the processing as shown in Table 2 is executed by the data processing element $54_6$, that is, the two-bit ALU, and the carry signal, if exists, is given to the pre-stage data processing element $54_5$, that is, the ALU through the pre-stage latch register $L_{16}$. Furthermore, when the data is transferred from the latch register $L_{16}$ to the pre-stage latch register $L_{15}$, operation is executed by the data processing element $54_5$, that is, the two-bit ALU. Then, the result is given to the latch register $L_{15}$, and the carry signal, if exists, is given to the pre-stage data processing element $54_4$, that is, the two-bit ALU. Likewise, in transferring the data from the latch register $L_{15}$ to the latch register $L_{14}$, and in transferring the data from the latch register $L_{14}$ to the latch register $L_{13}$, operations are executed by the respective data processing elements $54_4$ and $54_3$ that is, the two-bit ALU's. Accordingly, in the last register $L_{13}$ results of the operations of two eight-bit data are pushed-in at that stage.

In transferring the data from this latch register $L_{13}$ to the latch register $L_{12}$, the eight-bit shifter comprised in the data processing element $54_2$ is enabled as required and the functions as shown in Table 3 are executed and thereafter, the results thereof are given to the latch register $L_{12}$. Then, in transferring the data from this latch register $L_{12}$ to the latch register $L_{11}$, the plus, minus or zero deciding circuit comprised in the data processing element $54_1$ is enabled as required and the functions as shown in Table 4 are executed and the results thereof are stored in the foremost-stage latch register $L_{11}$. Thus, a predetermined data processing is executed along with a series of data transfer from the latch register $L_{17}$ to the latch register $L_{11}$.

The operation processing part 44 as described above is an asynchronous type system in itself and therefore such an operation processing part, that is, a data processing apparatus can be inserted in series into the asynchronous delay line ring, that is, the data transmission path 12 as shown in FIG. 1. In this case, the required time in each data processing element can be shortened to the extent of giving no trouble at all to data transmission by breaking up a series of data processings as shown in FIG. 9. This means that by constituting the data processing function as an asynchronous system as is the case of the present invention, the data processing function can be incorporated intact in the asynchronous self-running type shift register which is used as a data transmission path.

In the above-described embodiment, the data transmission path is controlled in a manner that normally (after initial reset) it is placed in the stop-released state and is placed in the stopped state only when a specific condition holds and is returned again to the stop-released state.

On the other hand, for example, in the case where a long time is required for data processing or in the case where two data transmission paths are required to be synchronize with each other, data transmission is required to be stopped in a specific-stage latch register when a certain conditions holds. Particularly, in the case where a plurality of data are transmitted closely on the same data transmission path, in response to an arrival of the data to be stopped at the corresponding register, transmission to the latch register before it has to be inhibited.

In such a case, if the data propagation delay time between the latch registers on the data transmission path becomes shorter than the time from the transmission command signal to the stop signal, a malfunction takes place. For this reason, a data transmission path whose propagation delay time is longer than the delay time of the output of the stop signal has to be designed and not only the transmission speed is sacrificed, but on the other hand, it is difficult to design the propagation delay of the data transmission path to a minimum within a range of causing no malfunction. Then, the following embodiment is proposed.

Figure 14:
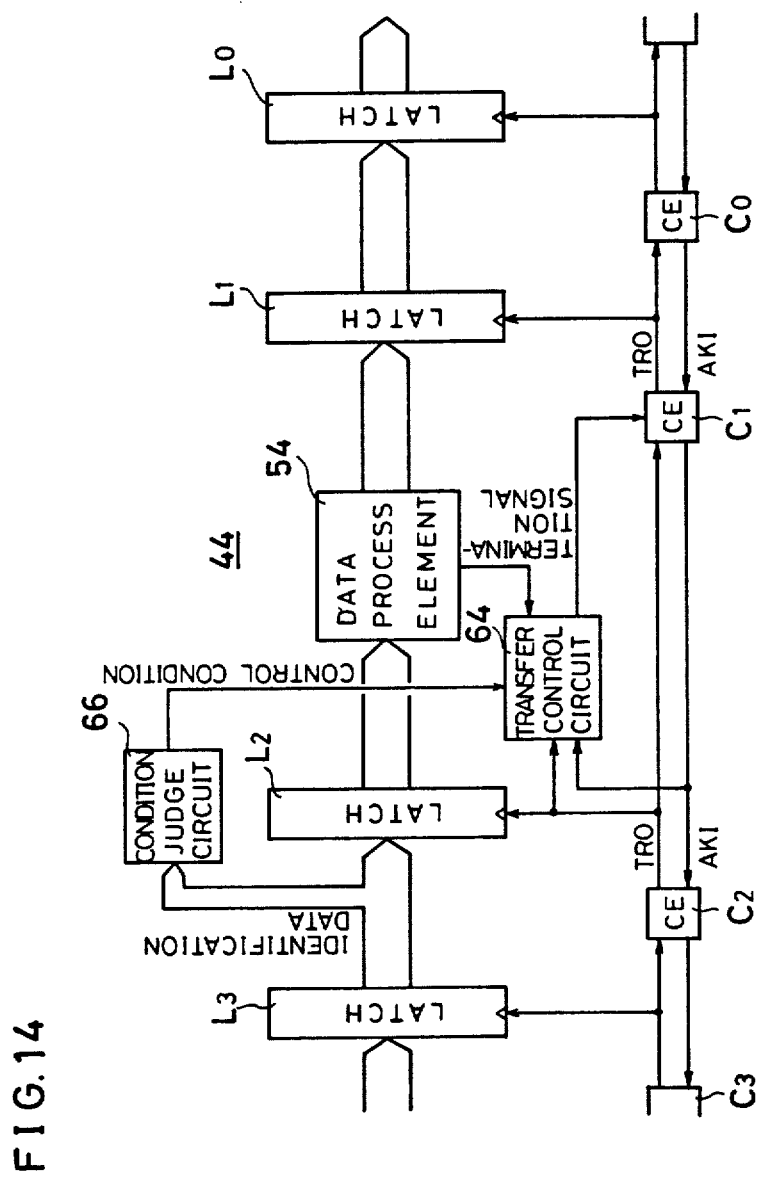
FIG. 14 is a block diagram showing still another embodiment in accordance with the present invention.

FIG. 14 is a schematic block diagram showing still another embodiment in accordance with the present invention.

The operation processing part 44, likewise the previous embodiment, comprises the latch registers $L_0$, $L_1$, $L_2$. - - - which are arranged in a cascade fashion and the C elements $C_0$, $C_1$, $C_2$, - - - which are installed in association therewith respectively. Then, these latch registers $L_0$–$L_3$ and C elements $C_0$–$C_3$ cooperate to constitute an asynchronous self-running type shift register.

As shown in FIG. 14, for example, the data processing element 54 comprising, for example, the ALU (Arithmetic Logic Unit) and the multiplier and the like is disposed between the latch registers $L_1$ and $L_2$ constituting the asynchronous self-running type shift register.

In this embodiment, a transfer control circuit 64 is further installed and this transfer control circuit 64 receives the signal AKI from the C element $C_1$ associated with the pre-stage latch register $L_1$ and also receives the signal TRO from the C element $C_2$ associated with the following latch register. A processing termination signal from the data processing element 54 and further a control condition signal from a condition judgment circuit are given to the transfer control circuit 64. The processing termination signal is outputted responding to an end of processing in the data processing element 54, for example, data processing specified by the operation code such as operation, modification or deformation.

Figure 15:
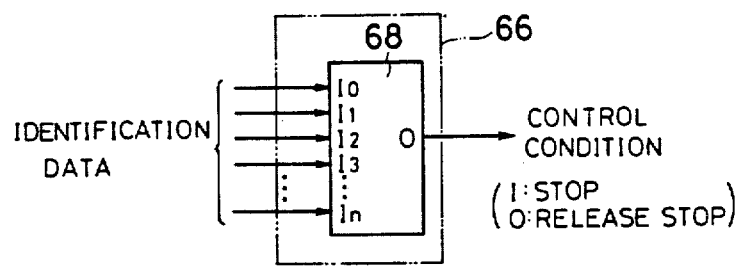
FIG. 15 is a block diagram showing one example of a condition judgment circuit of FIG. 14 embodiment.

As shown in FIG. 15, the condition judgment circuit 66 comprises one decoder 68 and an input of this decoder 68 receives the operation code comprised in the data packet sent to the pre-stage latch register $L_2$ from the post-stage latch register $L_3$, and outputs the control condition for stopping or releasing stop represented by "1" or "0".

Figure 16:
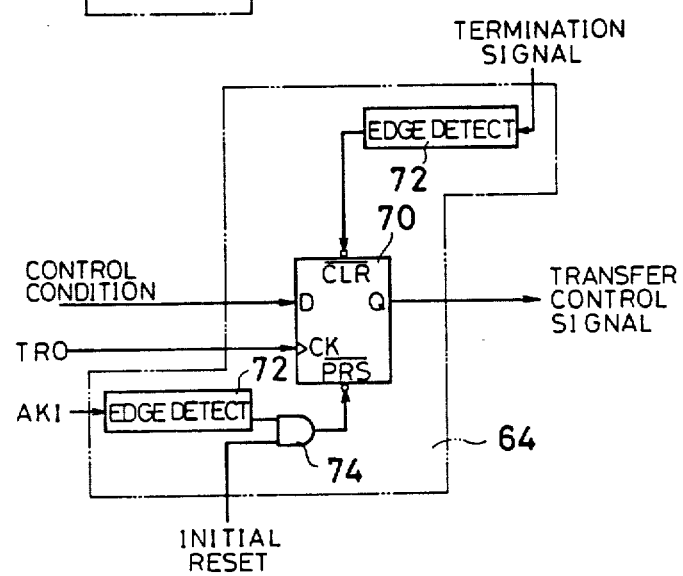
FIG. 16 is a block diagram showing one example of a transfer controlling circuit of FIG. 14 embodiment.

In reference to FIG. 16, the transfer control circuit 64 comprises a D flip-flop 70 and the control condition signal from the decoder 68 comprised in the previous condition judgment circuit 66 is given to a data input D of this D flip-flop 70. The data transmission signal TRO from the post-stage C element $C_2$ is given to a clock input CK of the D flip-flop 70 and ANDed output of an acknowledge signal AKI from the pre-stage C element $C_1$ and an initial reset signal is given to a preset input PRS. To be detailed, the signal AKI is given to a rising edge detecting circuit 72 and the initial reset signal (low-level pulse) are given as two inputs of and AND gate 74. Then, the output of this AND gate 74 is given to the input PRS of the D flip-flop 70.

The processing termination signal from the data processing element 54 is further given to a clear input CLR of the D flip-flop 70 through the rising edge detecting circuit 72.

Figure 17:
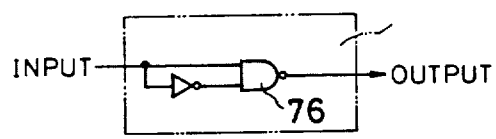
FIG. 17 is a block diagram showing one example of an edge detecting circuit of FIG. 14 embodiment.

As shown in FIG. 17, the rising edge detecting circuit 72 comprises a NAND gate 76 which receives an input signal and the inversion thereof. Accordingly, when an input signal (signal AKI or processing end signal) is given, the rising edge detecting circuit 72 outputs a low-level pulse at the rising edge thereof.

Description is made on operation of FIG. 14 embodiment. First, when the header of the data packet s shown in FIG. 2 or FIG. 8 is latched by the last-stage latch register $L_3$ in FIG. 14, the identification data in this header, for example, the operation code is inputted to the condition judgment circuit 66. A control condition signal of whether or not the data packet is to be stopped as a result of decoding the content of the operation code is outputted by "1" or "0" from the condition judgment circuit 66.

In the initial state, the transfer control circuit 64 receives the initial reset signal. At this time, the signal AKI is also kept intact at the low lever and therefore the low level is given as a preset input of the D flip-flop 70 and the transfer control signal of the high level ("1") is outputted from this D flip-flop 70, that is, the transfer control circuit 64. This transfer control signal is inputted to the terminal $T_6$ (FIG. 4) as the stop signal STOP of the C element $C_1$. Accordingly, at this initial reset, the C element $C_1$ is placed in the stopped state.

When the header of the data packet inputted to the latch register $L_2$ is the one to be sent to the pre-stage latch register $L_1$, the control condition signal of the low level for releasing the stopped state is obtained from the condition judgment circuit 66. Accordingly, the D flip-flop 70 of the transfer control circuit 64 reads the low level thereof at the rise of the transfer signal TRO from the associated C element $C_2$ and consequently an output Q goes to the low level at the rise of the signal TRO. Responsively, the stop signal STOP from the transfer control circuit 64 goes to the low level and the stopped state of the pre-stage C element $C_1$ is released. Then, the signal TRO of this C element $C_1$ also rises by the signal TRO of the post-stage C element $C_2$. On the other hand, the acknowledge signal AKI from this C element $C_1$ falls. Accordingly, the data transfer from the post-stage latch register $L_2$ to the pre-stage latch register $L_1$ is made possible.

When the data word is transmitted from the latch register $L_2$ to the latch register $L_1$ as described above, the signal AKI from the C element $C_1$ rises. This rising edge of the signal AKI is detected by the edge detecting 72 and "0" or the low level is inputted to the D flip-flop 70 as a preset input at this timing, and the C element $C_1$ is returned again to the stopped state.

When the control condition signal from the condition judgment circuit 66 is of the low level, that is, when the data packet is to be transmitted to the pre-stage, the above-described operation is repeated, and the data packet is transmitted on the data transmission path without being stopped.

When the control signal from the condition judgment circuit 66 is of the high level, that is, when the data word loaded in the latch register $L_2$ is the one not to be transmitted to the pre-stage latch register $L_1$, if the signal TRO from the C element $C_2$ rises, the high level of the control signal is read into the D flip-flop 70 of the transfer control circuit 64. Responsively, the output Q of this D flip-flop 70 goes to the high level. Consequently, the C element $C_1$ associated with the pre-stage latch register $L_1$ is kept intact in the stopped state. Accordingly, the data word stops at the latch register $L_2$ and processing is performed for the stopped data word in the data processing element 54.

The data processing element 54 outputs the low level during data processing and therefore the D flip-flop 70 of the transfer control circuit 64 is not cleared. When the data processing ends and the data processing termination signal of the high level is obtained from the data processing element 54, this signal is detected by the edge detecting circuit 72, and a low-level pulse is outputted from this edge detecting circuit 72, the D flip-flop 70 is cleared and the output Q of the D flip-flop 70 is turned to the low level. Responsively, the stop signal from this transfer control circuit 64 is released, and the signal TRO of the C element $C_2$ rises and the data packet is transmitted to the pre-stage latch register $L_1$. Then, the signal AKI from the associated C element $C_1$ rises and the D flip-flop 70 is preset again and the output Q thereof goes to the high level. Accordingly, the C element $C_1$ is placed again in the stopped state.

Thus, the transfer control circuit 64 controls transfer of the data packet to the pre-stage. This means that normally the data transmission path is kept in the stopped state and the stopped state is released each time as required.

Figure 18:
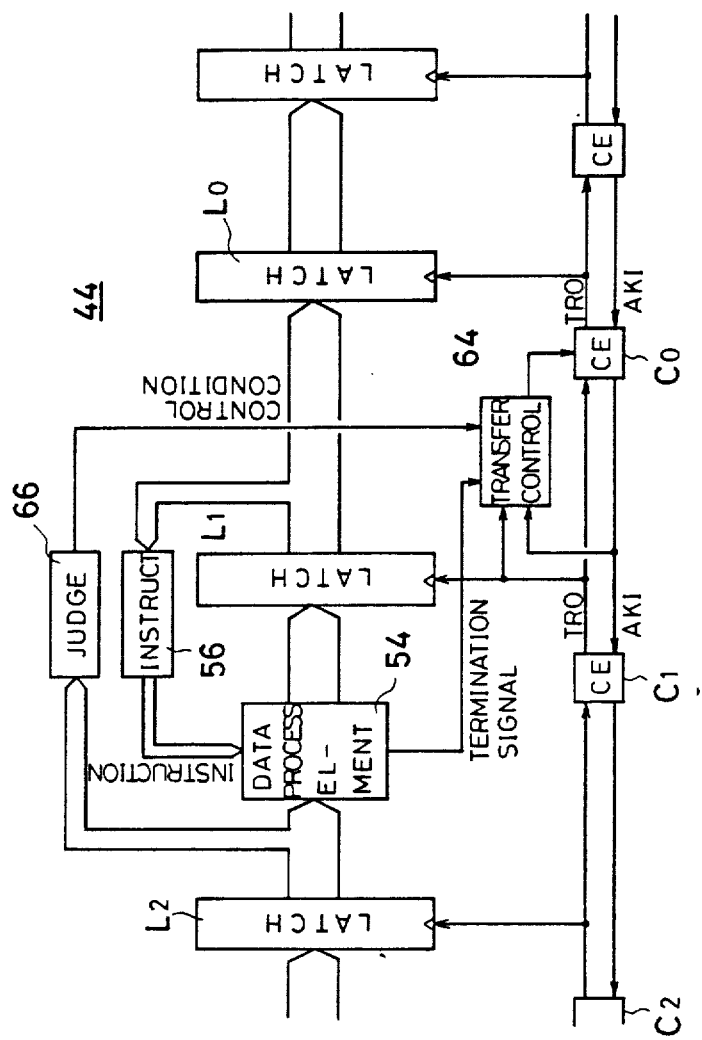
FIG. 18 is a block diagram showing another embodiment in accordance with the present invention.

FIG. 18 is block diagram showing another embodiment in accordance with the present invention. In FIG. 18 embodiment, the transfer control circuit 64 has a constitution and operation as shown in FIG. 16, which are the same as those of the embodiment in FIG. 14. However, in this embodiment, the first data word in one data packet stops at the latch register $L_1$ and thereafter the following data word is loaded in the latch register $L_2$ and at this time, the data processing element 54 processes the data word.

Meanwhile, in this FIG. 18 embodiment, the process instructing circuit 56 similar to that of FIG. 6 embodiment is installed. Then, the operation code (FIG. 2) from the pre-stage latch register $L_1$ is given to this process instructing circuit 56 and this process instructing circuit 56 outputs the kind of processing or the sequence of kinds of processing for the following operand data.

The operation of this FIG. 18 embodiment is basically the same as that of FIG. 14 embodiment and therefore duplicate description thereon is omitted here.

Figure 19:
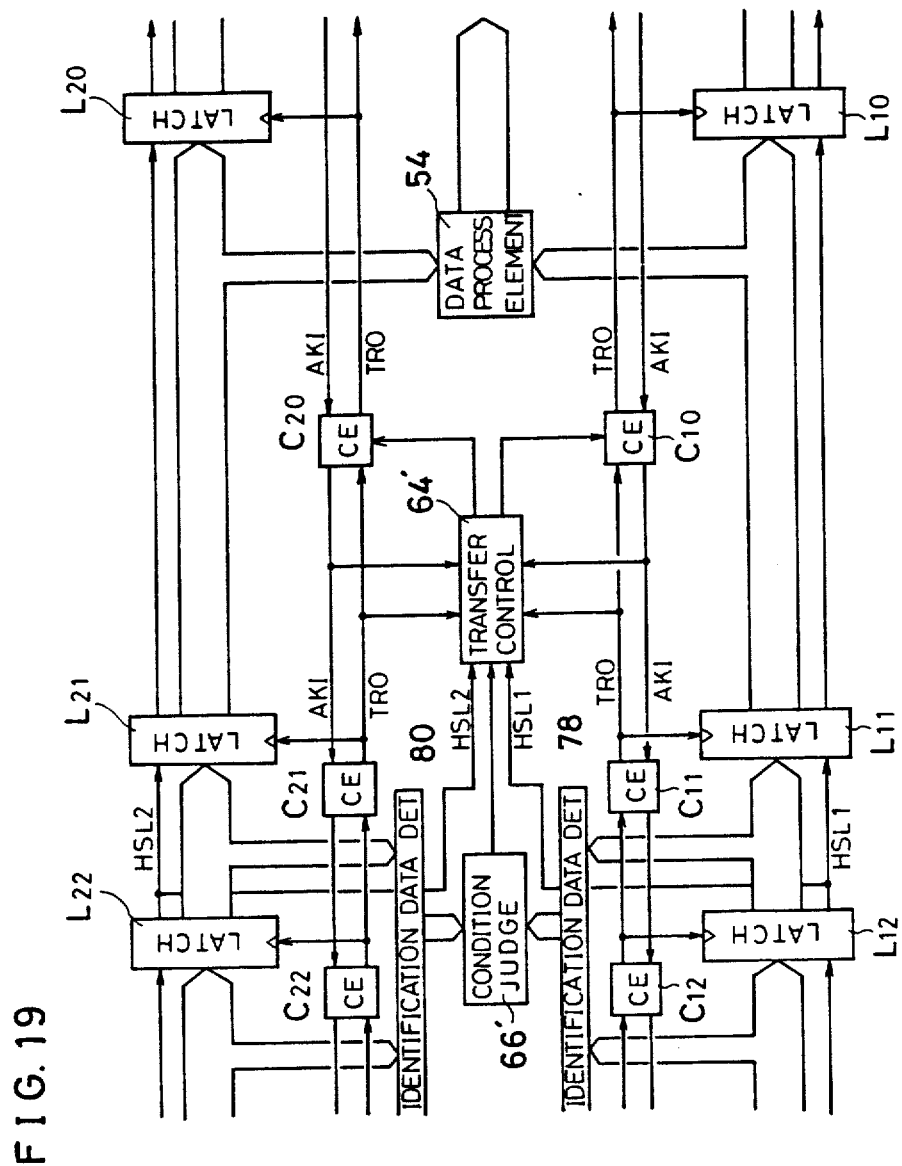
FIG. 19 is a block diagram showing still another embodiment in accordance with the present invention.

FIG. 19 is a block diagram showing still another embodiment in accordance with the present invention. In this embodiment, a transfer control circuit 64' is employed to synchronize two data transmission paths when the data packets transmitted on two data transmission paths are processed by the data processing element 54.

To be detailed, a first data transmission path comprises latch registers $L_{10}$, $L_{11}$, $L_{12}$, - - - which are connected in a cascade fashion and associated C elements $C_{10}$, $C_{11}$, $C_{12}$, - - - and a second data transmission path comprises latch registers $L_{20}$, $L_{21}$, $L_{22}$, - - - and associated C elements $C_{20}$, $C_{21}$, $C_{22}$, - - - . Then, the operand data are given to the data processing element 54 respectively from between the latch registers $L_{10}$ and $L_{11}$ and from between the latch registers $L_{20}$ and $L_{21}$.

On the other hand, the identification data, that is, the operation codes are taken out from the following latch registers $L_{12}$, $L_{13}$, $L_{22}$ and $L_{23}$ respectively, being given to the corresponding identification data detecting circuits 78 and 80. These identification data detecting circuits 78 and 80 are constituted, for example, as shown in FIG. 20 and detect or extract the identification data (operation code) from the data packets transmitted on the associated data transmission paths, respectively.

Figure 20:
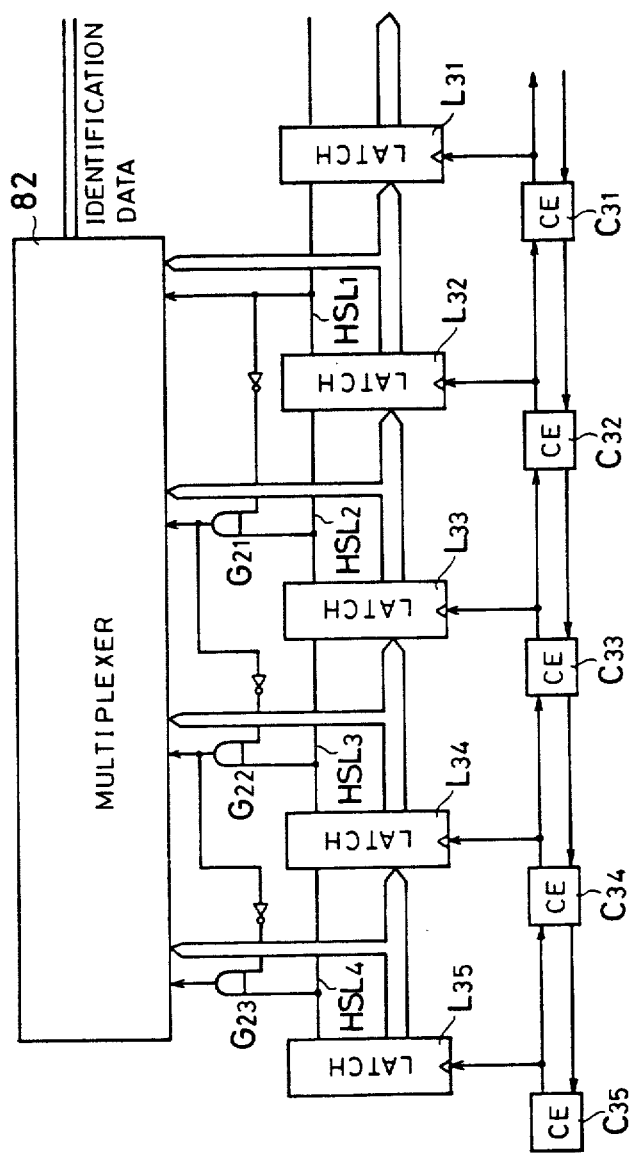
FIG. 20 is a block diagram showing one example of an identification data detecting circuit of FIG. 19 embodiment.

FIG. 20 is a block diagram showing one example of the identification data detecting circuit applicable to FIG. 19 embodiment. In this embodiment, illustration and description is made only on the first identification data detecting circuit 78 which takes out the identification data from one of data transmission paths.

In FIG. 20, the identification data detecting circuit 78 comprises a multiplexer 82 which receives data from latch registers $L_{32}$, $L_{33}$, $L_{34}$ and $L_{35}$ comprised in the first data transmission path. This means that outputs of four latch registers are inputted to the multiplexer in transferring the data packet from the post-stage latch register to the pre-stage latch register.

A header signal line HSL is connected to the 18th bit, that is, one bit of the order code of each of the latch registers $L_{31}$–$L_{35}$. A header signal line $HSL_1$ between the latch registers $L_{31}$ and $L_{32}$ is given to the multiplexer 82 and is also inverted by an inverter to be given to one of inputs of an AND gate $G_{21}$. A header signal line $HSL_2$ connected between the latch registers $L_{32}$ and $L_{33}$ is given to the other input of the AND gate $G_{21}$. The output of the AND gate $G_{21}$ is given to the multiplexer 82 and is also inverted by an inverter, being given to one of inputs of an AND gate $G_{22}$. A header signal line $HSL_3$ connected between the latch registers $L_{33}$ and $L_{34}$ is given to the other input of the AND gate $G_{22}$. The output of the AND $G_{22}$ is given to the multiplexer 82 and is also inverted by an inverter, being given to one of inputs of a two-input AND gate $G_{23}$. The output of a header signal line $HSL_4$ connected between the latch registers $L_{34}$ and $L_{35}$ is given to the other input of this AND gate $G_{23}$ and the output thereof is given to the multiplexer 82.

The outputs of these header signal line $HSL_1$ and AND gates $G_{21}$–$G_{23}$ are given as enable signal for the corresponding inputs of the multiplexer 82.

The identification data extracted from the first data transmission path is given to a condition judgment circuit 66' (FIG. 19) from the multiplexer 82 through an identification data line.

In the initial state, all of the header signal lines $HSL_1$–$HSL_4$ are of the low level. When the header of the data packet is transferred to the latch register $L_{35}$ from the post-stage latch register, the header signal line $HSL_4$ goes to the high level. On the other hand, the header signal line $HSL_3$ between the latch registers $L_{34}$ and $L_{33}$ is still of the low level and accordingly, the output of the AND gate $G_{22}$ is of the low level. This low level is inverted and is given to the AND gate $G_{23}$ and consequently, at this point, the high level is outputted from this AND gate $G_{23}$.

When the output of AND gate $G_{23}$ goes to the high level, the corresponding input of the multiplexer 82 is enabled and the identification data from the identification line between the latch register $L_{35}$ and $L_{34}$ is outputted from the multiplexer 82.

Thereafter, when a vacancy of the latch register $L_{34}$ is detected by the C element $C_{35}$, the header of the data packet is transferred to this latch register $L_{34}$ from the latch register $L_{35}$. Responsively, the header signal line $HSL_3$ goes to the high level, the output of the AND gate $G_{22}$ goes to the high level likewise and the AND gate $G_{23}$. This high-level output of the AND gate $G_{22}$ is inverted and is given to the AND gate $G_{23}$ and consequently the output of the AND gate $G_{23}$ is turned to the low level. On the other hand, the AND gate $G_{22}$ works as an enable signal of the corresponding input of the multiplexer 82, and the identification data comprised in the header transferred from the latch register $L_{34}$ to the latch register $L_{33}$ is outputted from the multiplexer 82.

When the header of the data packet is transferred to the latch register $L_{32}$ from the latch register $L_{13}$ by repeating such an operation, the header signal line $HSL_1$ goes to the high level. Consequently, the output of the AND gate $G_{21}$ goes the low level likewise and the AND gates $G_{22}$ and $G_{23}$. When the header signal $HSL_1$ goes to the high level, the corresponding input of the multiplexer 82 is enabled, and the identification data comprised in the data packet from the latch register $L_{32}$ is outputted from the multiplexer 82. This means that the same identification data is continuously outputted from the multiplexer 82 during transferring with the data packets placed in four latch registers. Thus, the identification data can be held for a certain time by using the multiplexer 82. Thus, in this embodiment, in the case where any one of the header signal lines $HSL_1$–$HSL_4$ is of the high level, the identification data existing in the foremost stage is selected.

In the case where the header of the data packet is transferred from the latch register $L_{32}$ to the foremost stage latch register $L_{31}$ and the following data words other than the header are transferred to the latch register $L_{32}$ and then the header signal line $HSL_1$ goes to the low level again and accordingly, any one of the header signal lines $HSL_1$–$HSL_4$ goes to the high level by the header of the following data packet, the identification data existing at the foremost-stage among the header signal lines $HSL_1$–$HSL_4$ is selected by the circuit constitution as described above.

Meanwhile, in an example in FIG. 20, the number of stages of the latch registers where-from the multiplexer 82 receives data can be set arbitrarily in response to the time required.

Figure 21:
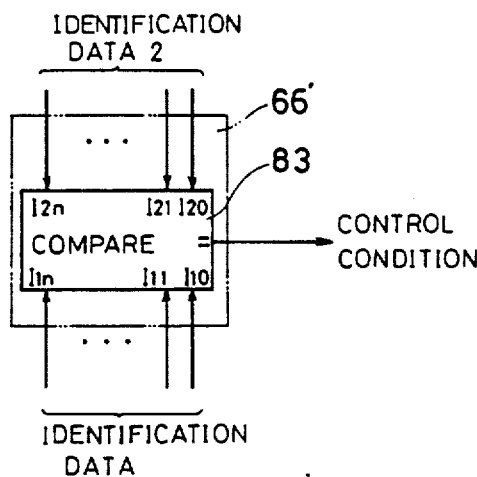
FIG. 21 is a block diagram showing one example of a condition judgment circuit of FIG. 19 embodiment.

Reverting to FIG. 19, the identification data detected by the identification data detecting circuits 78 and 80 are inputted to the condition judgment circuit 66'. The condition judgment circuit 66' comprises a comparator circuit 84 as shown in FIG. 21 and decides on a certain relation between two identification data, for example, coincidence or non-coincidence. Then, when the two identification data coincide, "1" is outputted as a control signal from the condition judgment circuit 66'. This control signal is inputted to the transfer control circuit 64'.

The header signal lines $HSL_1$ and $HSL_2$ from the respective data transmission paths are further connected to the transfer control circuit 64' These header signal lines $HSL_1$ and $HSL_2$ are connected respectively to the 18th bits of the latch registers $L_{10}$, $L_{11}$, - - - and $L_{20}$, $L_{21}$, - - - and take out signals indicating arrival of the header.

Figure 22:
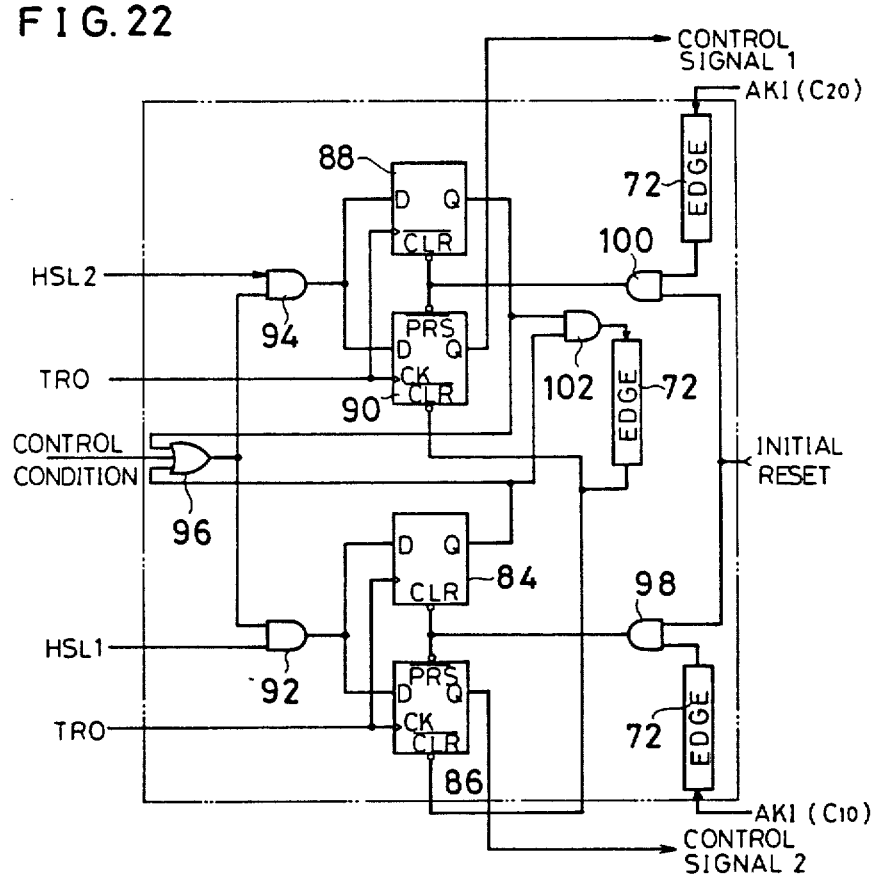
FIG. 22 is a block diagram showing one example of a transfer controlling circuit of FIG. 19 embodiment.

As shown in FIG. 22, the transfer control circuit 64' comprises two pairs of D flip-flops 84, 86 and 88, 90. Then, the output from an AND gate 92 receiving the header signal from the header signal line $HSL_1$ is given to the data input D of the D flip-flops 84 and 86 as one of inputs thereof. On the other hand, the output from an AND gate 94 receiving the header signal from the header signal $HSL_2$ is given to the data input D of the D flip-flops 88 and 90 as one of inputs thereof. An OR gate 96 is installed and as three inputs of this OR gate, the control condition signal from the above-described condition judgment circuit 66' and respective outputs Q of the D flip-flops 84 and 88 are given. Then, the output of this OR gate 96 is given as the other input of each of the above-described AND gates 92 and 94.

On the other hand, the signal AKI from the C element $C_{10}$ is given to one of inputs of the AND gate 98 through the rising edge detecting circuit 72 and similarly the signal AKI from the C element $C_{20}$ is given to one of inputs of an AND gate 100 through the rising edge detecting circuit. Then, the initial reset signal is given to the other input of each of the two AND gates 98 and 100. The output of the AND gate 98 is given to the clear input CLR of the D flip-flop 84, also being given to the preset input PRS of the D flip-flop 86. Likewise, the output of the AND gate 100 is also given to the clear input CLR of the D flip-flop 88 and the preset input PRS of the D flip-flop 90.

Both outputs Q of the D flip-flops 84 and 88 are given to the rising edge detecting circuit 72 through an AND gate 102. Then, the output of this rising edge detecting circuit 72 is given as the clear input CLR of each of the D flip-flops 86 and 90. The outputs Q of these D flip-flops 86 and 90 are given to the associated C elements $C_{10}$ and $C_{20}$ as a control signal 1 and a control signal 2, respectively. This means that among the four D flip-flops 84-90 as shown in FIG. 22, the D flip-flops 84 and 86 control one of the data transmission paths and the D flip-flops 88 and 90 control the other data transmission path, respectively. Accordingly, the control signal 1 and the control signal 2 from the D flip-flops 86 and 90 are both outputted as "1" in the stopped state and as "0" in the stop-released state.

When the initial reset signal is given, the preset input is given to the D flip-flops 86 and 90 and the respective outputs Q of these D flip-flops 86 and 90 are set to the low level. Accordingly, the C elements $C_{10}$ and $C_{20}$ receiving the control signal 1 and the control signal 2 are both place in the stopped state.

When two data packets to be synchronized, that is the data whose identification data coincide are not detected, the control condition signal from a comparator circuit 83 of the condition judgment circuit 66' is "0". Accordingly, at this time, data inputs D of four D flip-flops are all kept intact at the low level. Accordingly, the D flip-flops 84 and 86 repeat such operations as to read the low-level input data of the signal TRO from the C element $C_{21}$ and the signal TRO from the C element $C_{11}$ at the rises thereof respectively, thereafter being set to the high level ("1") at the rises of the signal AKI from the C element $C_{20}$ and the signal AKI from the C element $C_{10}$. Accordingly, the two data transmission paths independently perform transmission of the data packet from the post-stage latch register to the pre-stage latch register. This operation is the same as in the case of control in the previous FIG. 15 and at this time, the D flip-flops 88 and 90 remain at the low level.

When two data packets to be synchronized are detected by the condition judgment circuit 66', the control signal from this circuit 66' is "1". Then, if one of the two data packets arrives first at the lower-side data transmission path, the header signal line $HSL_1$ goes to the high level, and the signal TRO from the associated C element $C_{11}$ rises. Then, the D flip-flop 84 is set and the output Q thereof goes to the high level. The output of this D flip-flop 84 is inputted to the OR gate 96. Accordingly, this D flip-flop 84 and 86 are held until another data packet to be paired arrives at the upper-side data transmission path. This means that one data transmission path waits for an arrival of the data packet in the other data transmission path while kept intact in the stopped state.

Thereafter, when the data packet to be paired arrives at the other data transmission path, the header signal line $HSL_2$ goes to the high level and the signal TRO from the associated C element $C_{21}$ rises. Accordingly, the D flip-flop 88 is set with the D flip-flop 90 set intact. Accordingly, the outputs Q of these D flip-flops 88 and 90 both go to the high level and the output of the AND gate 102 is turned to the high level. Responsively, a low-level pulse from the edge detecting circuit 72 is inputted to the clear inputs of the D flip-flops 86 and 90 and the D flip-flops 86 and 90 are both reset. Accordingly, the outputs of the two D flip-flops 86 and 90 are both turned to the low level and consequently the stopped state of the two data transmission paths are released simultaneously and transmissions of the data packets are started simultaneously. Thus, synchronism of two data packets is established.

When the stopped state is released, transmission of the data packets ends and the signals AKI from the C elements $C_{10}$ and $C_{20}$ associated with the pre-stage latch registers rise to the high level and the D flip-flops 86 and 90 are set again to "1", and the D flip-flops 84 and 88 are reset to "0" to be restored to the initial state. In this initial state, the outputs Q of the D flip-flops 86 and 90 are both of the high level and therefore transmissions of the data packets on the two data transmission paths are stopped.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing apparatus, comprising:
    a plurality of latching means coupled in a cascade fashion for data flow from a post-stage latching means to a pre-stage latching means;
    data processing means coupled between the post-stage latching means and the pre-stage latching means;
    designating means for decoding a designation code included in the data at the pre-stage latching means and for designating a kind of data processing to be performed in said data processing means, said data processing means being responsive to said designation means for processing the data from at least one of said post-stage latching means and said pre-stage latching means in accordance with the kind of data processing as was designated by said designating means; and
    controlling means for inhibiting data transfer to the pre-stage latching means when the pre-stage latching means is not vacant and for allowing data transfer to the pre-stage latching means when the pre-stage latching means is vacant so that a result of the data processing in said data processing means is transferred to the pre-stage latching means in response to vacancy of the pre-stage latching means.

2. A data processing apparatus in accordance with claim 1, wherein said controlling means comprises a means for transferring data after processing by said data processing means to the pre-stage latching means.

3. A data processing apparatus in accordance with claim 2, wherein said data comprises an operation code and operandi data, and
    said designating means comprises a means for decoding said operation code from the pre-stage latching means.

4. A data processing apparatus in accordance with claim 3, which further comprises a means for inputting said operandi data from the pre-stage latching means to said data processing means, wherein
    said data processing means processes operandi data from the pre-stage latching means and operandi data from the post-stage latching means in response to designation from said designating means.

5. A data processing apparatus in accordance with claim 3, wherein said data comprises an operation code and a plurality of operandi data, and
    said designating means comprises a means for generating a sequence of kinds of processing for said plurality of operandi data based on said operation code.

6. A data processing apparatus in accordance with claim 3, wherein one data word of said data includes a plural number of operandi data, and
    said data processing means processes said plural number of operandi data from the post-stage latching means based on designation from said designating means.

7. A data processing apparatus in accordance with claim 2, further comprising a plurality of processing designating means responsive to content of the pre-stage latching means so that said plurality of processing designating means designate a kind of processing for the data processing means in accordance with said content.

8. A data processing apparatus in accordance with claim 7, wherein said plurality of data processing means are controlled by said plurality of processing designating means so as to perform a series of data processings of a single kind.

9. A data processing apparatus in accordance with claim 1, which further comprises means for placing said controlling means in a stopped state and for releasing said controlling means from said stopped state.

10. A data processing apparatus in accordance with claim 9, wherein said placing means emits a stop signal to said controlling means, said controlling means being responsive to said stop signal for preventing data transfer from a post-stage latching means to a pre-stage latching means.

11. A data processing apparatus in accordance with claim 10, which further comprises a condition deciding means for making a decision as to whether or not to release the stopped state and for producing a condition signal indicative of said decision, said placing means responsive to said condition signal from said condition deciding means for controlling said transferring means in accordance with said decision from said condition deciding means.

12. A data processing apparatus in accordance with claim 11, wherein said data processing means outputs a termination signal when processing for data ends, and
    said transfer controlling means releasing the stopped state of said controlling means in response to said termination signal.

13. A data processing apparatus in accordance with claim 9, wherein said placing means emits a stop signal to said controlling means in response to an end of data transfer from a post-stage latching means to a pre-stage latching means.

14. A data transmission path comprising:
    a self-running type shift register which includes a pre-stage latching means and a post-stage latching means coupled in a cascade fashion and means for pushing-in and popping-up data;
    data processing means coupled between the post-stage latching means and the pre-stage latching means of the self-running type shift register so that said pushing-in and popping-up data means shifts the data from said post-stage latching means to said pre-stage latching means via said data processing means in response to a signal generated by means for detecting vacancy or said pre-stage latching means; and
    designating means for decoding a designation code included in the data at the pre-stage latching means and for designating the kind of data processing to be performed in said data processing means, said data processing means being responsive to said designating means for processing the data from said post-stage latching means and said pre-stage latching means in accordance with the kind of the data processing designated by said designating means.

15. A data transmission path in accordance with claim 14, which further comprises a transferring means for transferring data after processing by said data processing means in response to a detection of vacancy of the pre-stage latching means by said detecting means.

16. A data transmission path in accordance with claim 14, wherein said data processing means is controlled by said designating means so as to perform a series of data processings of a single kind.

17. A data transmission path in accordance with claim 14, wherein said data processing means is controlled by said designating means so as to perform data processings of different kinds.

18. A data transmission path in accordance with claim 14, which further comprises a transferring means for transferring data after processing by said data processing means to the pre-stage latching means.

19. A data transmission path in accordance with claim 18, which further comprises a placing means for placing said transferring means in a stopped state and for releasing said stopped state.

20. A data transmission path in accordance with claim 19, wherein said placing means emits a stop signal to said transferring means, said transferring means responsive to said stop signal for preventing data transfer from the post-stage latching means to the pre-stage latching means.

21. A data transmission path in accordance with claim 20, which further comprises a condition deciding means for making a decision as to whether or not the stopped state is to be released and for producing a condition signal indicative of said decision, said placing means being responsive to the condition signal from said condition deciding means for controlling said transferring means in accordance with said decision from said condition deciding means.

22. A data transmission path in accordance with the claim 21, wherein said data processing means emits a termination signal when processing of data ends, said transfer controlling means releasing the stopped state of said transferring means in response to said termination signal.

23. A data processing apparatus, comprising:
a self-running type shift register including a plurality of latch registers coupled in a cascade fashion, a plurality of coincidence elements for inhibiting transfer of data from a post-stage latch register to a pre-stage latch register when the pre-stage latch register is not vacant and for allowing transfer of data from the post-stage latch register to the pre-stage register when the per-stage latch register is vacant, and means for shifting and latching a predefined data packet into the respective latch registers on a word basis;
data processing means coupled between the post-stage latch register and the pre-stage latch register for processing operand data from at least one of the post-stage and pre-stage latch registers; and
designating means for decoding an operation code included in a data word at the pre-stage latch register and for designating a kind of data processing t be performed in said data processing means, said data processing means being responsive to said designating means for performing the kind of data processing designated so as to produce a result, said coincident elements allowing the result of data processing in said data processing means to transfer to the pre-stage latch register when the pre-stage latch register is in the vacant state.

* * * * *